US005796569A

United States Patent [19]

Gronowicz, Jr.

[11] Patent Number: 5,796,569

[45] Date of Patent: Aug. 18, 1998

[54] CYLINDRICAL PTC CIRCUIT OVERCURRENT PROTECTION DEVICE

[75] Inventor: William Gronowicz, Jr., Westland, Mich.

[73] Assignee: Yazaki Corporation, Tokyo, Japan

[21] Appl. No.: 878,649

[22] Filed: Jun. 19, 1997

[51] Int. Cl.[6] .......... H02H 5/04

[52] U.S. Cl. .......... 361/106; 337/12; 338/22 R; 338/22 SD

[58] Field of Search .......... 337/12, 14, 15, 337/298; 338/22 R, 22 SD, 20, 211, 212, 52, 57, 333; 361/27, 58, 106; 219/328, 330, 331, 505, 553

[56] References Cited

U.S. PATENT DOCUMENTS 4,549,161 10/1985 McTavish .
4,967,176 10/1990 Horsma .
5,382,936 1/1995 Hansson et al. .......... 338/22 R

*Primary Examiner*—Leo P. Picard
*Assistant Examiner*—Anatoly Vortman
*Attorney, Agent, or Firm*—Young & Basile, P.C.

[57] ABSTRACT

A self-resetting circuit overcurrent protection device suitable for use as a replacement for a conventional cylindrical fuse has at least one semi-tubular positive temperature coefficient (PTC) element surrounded by a tubular, electrically insulating body and connected to terminal caps disposed at either end of the cylinder. In a first embodiment of the invention, first and second PTC elements are disposed such that the concave surfaces thereof are oriented toward one another and are connected in electrical parallel so that the hold current of the PTC device is equal to the sum of the hold current values of each of the two elements. In a second embodiment, a first pair of semi-tubular PTC elements are disposed in nested, concentric relationship to one another and a second pair of semi-tubular PTC elements are disposed in nested, concentric relationship to one another, the two pairs of PTC elements being disposed with concave surfaces thereof facing one another. The four PTC elements are connected in electrical parallel so that the hold current of the device is equal to the sum of the hold currents of the four component PTC elements.

10 Claims, 1 Drawing Sheet

FIG-1
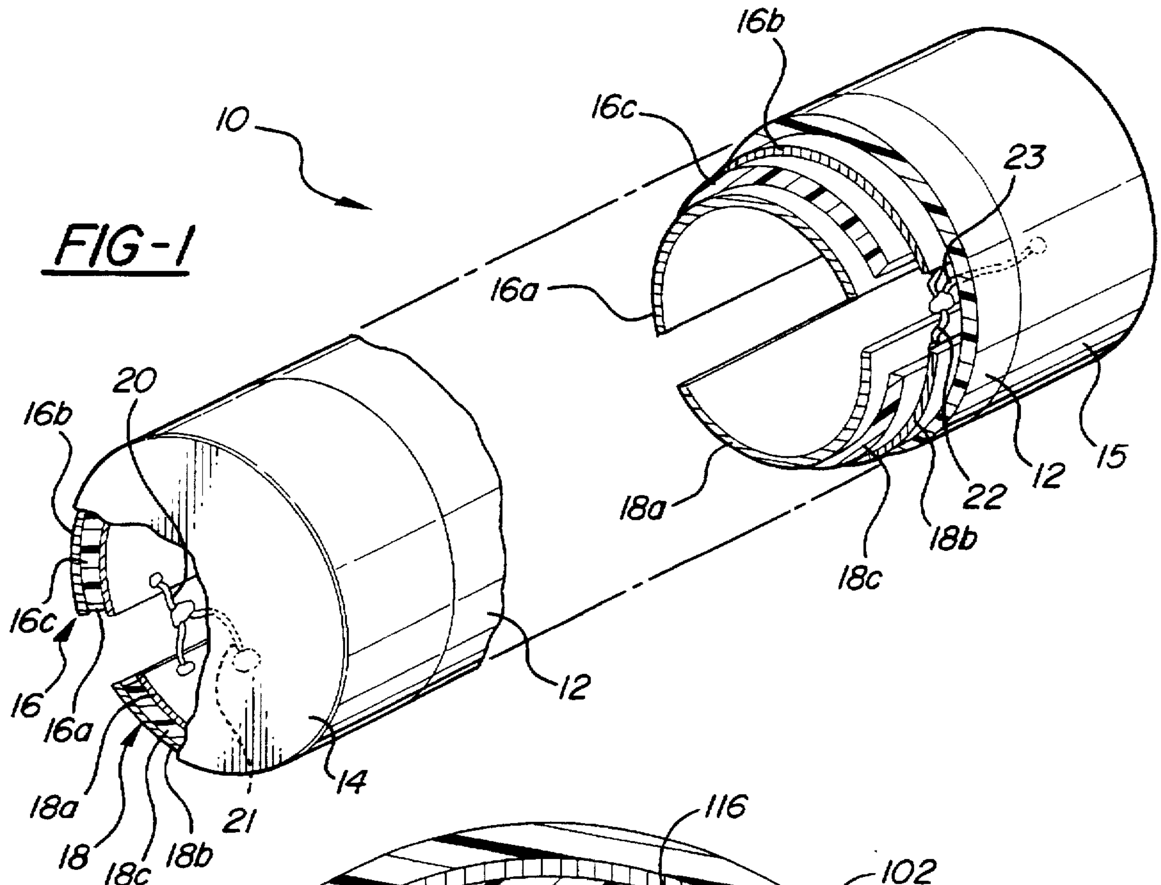
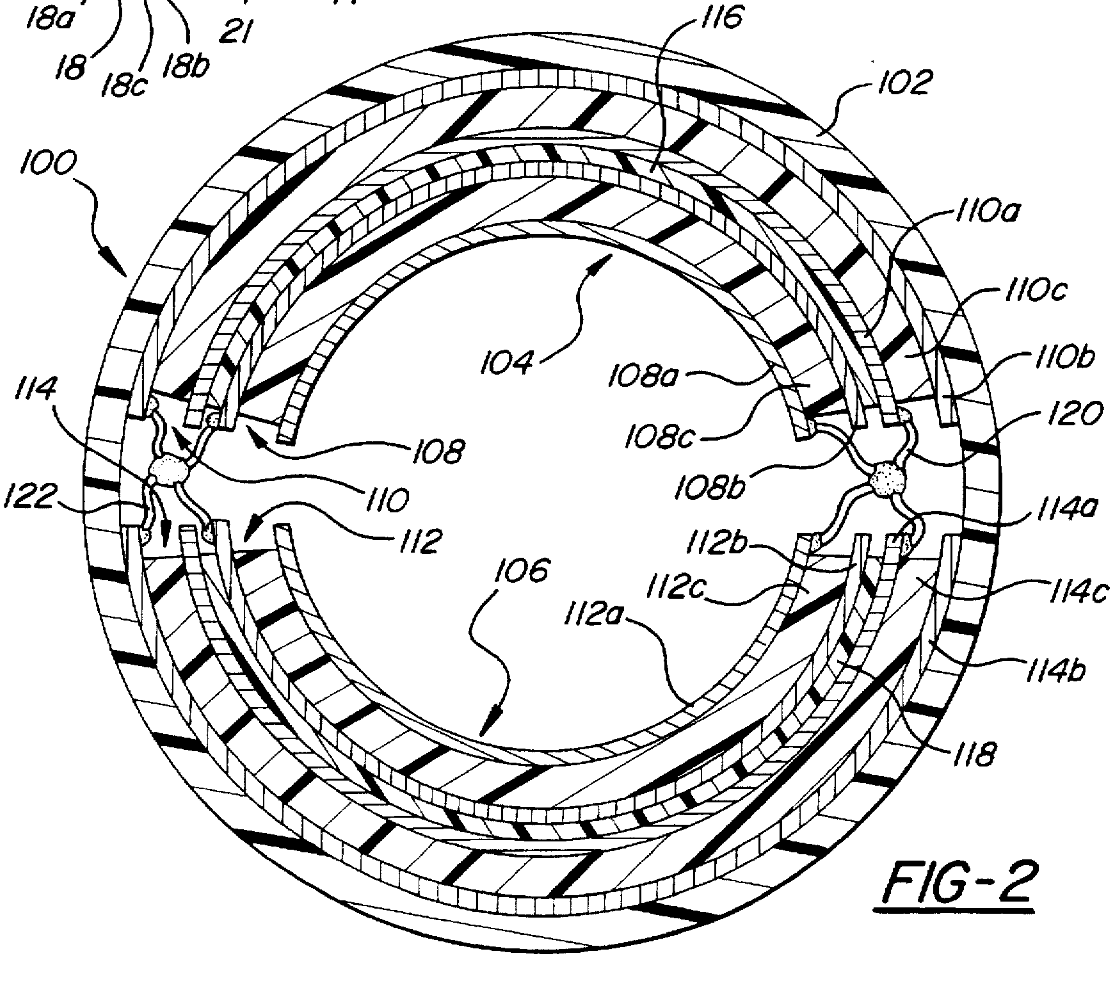
FIG-2

CYLINDRICAL PTC CIRCUIT OVERCURRENT PROTECTION DEVICE

FIELD OF THE INVENTION

This invention relates to self-resetting circuit overcurrent protection devices employing positive temperature coefficient materials.

BACKGROUND OF THE INVENTION

A circuit overcurrent protection device is an electrical circuit component which passes up to a certain level of electrical current, but "trips" or creates an open-circuit condition if the level of current rises above a certain limit. A fusible link is an example of such a device, the fuse "blowing" or "burning out" due to the increased temperature resulting from passage of a level of current above the fuse rating. After a fuse has blown, it must be removed from the circuit and replaced with a new, intact fuse in order for the circuit to resume operation.

A circuit breaker is a mechanical overcurrent protection device that trips to an open-circuit condition in response to high current. A circuit breaker does not have to be replaced after it trips, but must be manually reset to the closed-circuit condition before the circuit may resume operation.

A circuit overcurrent protection device is said to be self-resetting if, after tripping to the open-circuit condition, it is able to return to a closed-circuit condition without replacement or any other servicing. Self-resetting circuit overcurrent protection devices have been produced which make use of materials having a positive temperature coefficient of resistivity. Such materials exhibit an electrical resistivity which is relatively low at a design operating temperature and increases abruptly as the temperature of the material rises beyond a critical temperature. PTC materials include compositions such as conductive polymers and ceramics. PTC circuit overcurrent protection devices are manufactured by the Raychem Corporation, and are used in many electrical devices and environments.

A PTC circuit overcurrent protection device comprises a thin layer of PTC material sandwiched between two parallel plates of electrically conductive metal. An electrical lead is attached to each of the plates and the leads are connected to the electrical circuit. At a given operating temperature, there is a maximum steady level of electrical current which can pass from one plate to the other through the PTC material without causing significant resistance heating of the device. This level of current is dependent primarily upon the surface area of the layer of PTC material across which the current must flow in passing from one plate to the other, and is known as the "pass" or "hold" current.

Such a PTC device is designed so that when it is subjected to a level of current greater than the hold current, sufficient resistance heating of the device occurs to cause the temperature of the PTC material to climb to above the critical temperature. When this occurs, the electrical resistivity of the PTC layer becomes so great as to create what is essentially an open circuit. A very low level of current continues to pass between the metal plates, however, and this "trickle" of current may be sufficient to prevent the temperature of the device from dropping back below the critical temperature. The circuit must be broken at some other point, for example by switching off an electrical device powered by the circuit, in order for the trickle of current to cease and allow the PTC device to cool down to below its critical temperature so that the PTC material resumes its lower resistivity state. Once this occurs, the PTC circuit overcurrent protection device has essentially reset itself, without the need for any replacement or maintenance of the device, and is again able to provide protection against overcurrent conditions when the electrical device is switched back on.

A PTC device adapted to replace a fuse of the type having a rectangular body and two parallel blade-type terminals is disclosed in copending U.S. patent application attorney docket No. YAZ-024, MULTIPLE ELEMENT PTC OVERCURRENT PROTECTION DEVICE, filed May 16, 1997.

One commonly used type of fuse is cylindrical in overall shape, having conductive metal terminal caps separated by a tubular body made of glass or another non-conductive, transparent material. The fusible link or filament is contained within the body, extend between and electrically connected to the terminal caps. A receptacle for a cylindrical fuse comprises a pair of generally C-shaped terminal clips into which the terminal caps are snapped to retain the fuse securely in electrical connection with the circuit.

In some cases it may be desirable to replace a conventional cylindrical fuse with a PTC device in order to gain the advantages of the self-resetting capability of the PTC device. The thin, flat configuration of known PTC devices may, however, be incompatible with the existing fuse installation so that such a replacement is not feasible without a substantial redesign of the fuse receptacle and/or the associated environment. A PTC device having the necessary hold current may be too large to fit within the space allowed for the cylindrical fuse, and/or the receptacle terminals may not be compatible with the leads of the PTC device.

SUMMARY OF THE INVENTION

It is an object of the present invention to provide a self-resetting circuit overcurrent protection device suitable for use as a replacement for a conventional cylindrical fuse.

It is the further object of the invention to provide a cylindrical self-resetting circuit overcurrent protection device having at least one semi-tubular positive temperature coefficient (PTC) element.

In a first preferred embodiment of the invention disclosed herein, the invention cylindrical PTC device comprises first and second cylindrical terminal caps; a tubular, electrically insulating body connecting the terminal caps; and first and second semi-tubular PTC elements retained within the body and extending between the terminal caps, the elements disposed such that the concave surfaces thereof are oriented toward one another. The first and second PTC elements are connected in electrical parallel so that the hold current rating of the PTC device is equal to the sum of the hold current values of each of the two elements. This physical and electrical configuration of PTC elements results in the cylindrical PTC device having a hold current larger than could be achieved by a flat PTC element of small enough size to fit within the space allowed for a cylindrical fuse.

In a second preferred embodiment of the invention disclosed herein, the cylindrical PTC device comprises a first pair of semi-tubular PTC elements disposed in nested, concentric relationship to one another and a second pair of semi-tubular PTC elements disposed in nested, concentric relationship to one another. The two pairs of PTC elements are disposed with concave surfaces thereof facing one another. As in the first preferred embodiment, the four PTC elements are connected in electrical parallel so that the hold current of the device is equal to the sum of the hold currents of the four component PTC elements.

Accordingly, the invention cylindrical PTC device may be designed to have a hold current equal to that of a conventional cylindrical fuse and have an overall size and shape substantially identical to the fuse so that the self-resetting circuit overcurrent protection device may be used to replace a fuse without any redesign of the fuse receptacle or other environment.

These and other objects, features, and advantages of the present invention will be more clearly understood from the following written description, considered in combination with the accompanying drawings.

BRIEF DESCRIPTION OF THE DRAWINGS

FIG. 1 is a partially cut away perspective view of a cylindrical PTC circuit overcurrent protection device according to a first embodiment of the present invention; and FIG. 2 is a cross-sectional view of a second embodiment of the present invention.

DETAILED DESCRIPTION OF THE PREFERRED EMBODIMENT

As depicted in FIG. 1, the invention PTC circuit overcurrent protection device 10 comprises a hollow, tubular body 12 formed of a plastic or epoxy resin material and first and second metal terminal caps 14, 15, one attached to either end of the body to close off the open ends thereof. First and second semi-tubular PTC elements 16, 18 are located within the hollow interior of PTC device 10, extending along substantially the entire interior length of the PTC device and being disposed such that concave surfaces of the elements are oriented toward one another.

First PTC element 16 comprises curved inner and outer plates **16*a*, 16*b* respectively, the plates disposed in nested, concentric relationship to one another and separated by a layer of PTC material 16*c*. Second PTC element 18 is substantially identical to the first PTC element, comprising an inner plate 18*a* and an outer plate 18*b* in nested, concentric relationship to one another and separated by a layer of PTC material 18*c*. Plates 16*a*, 16*b*, 18*a*, 18*b*** are formed of an electrically conductive metal.

Inner plates **16*a*, 18*a* are electrically connected to one another at one or more points along their adjacent edges by jumper wires 20 which are soldered or otherwise connected to the inner plates. The inner plates are electrically connected to first end cap 14 by, for example, a wire 21, and are electrically insulated from second end cap 15. In a similar fashion, outer plates 16*b*, 18*b* are electrically connected to one another at one or more points along their adjacent edges by jumper wires 22, are electrically connected to second end cap 15 by a wire 23, and are electrically insulated from first end cap 14**. As an alternative to using wires to achieve electrical connection between the plates and their respective end caps, the two inner plates could be formed integrally with the first end cap and the two outer plates could be formed integrally with the second end cap.

The above-described connections result in first and second PTC elements 16, 18 being connected in electrical parallel: When PTC device 10 is connected into a circuit, current flowing into the device through metal end cap 14 is conducted to both of the inner plates **16*a*, 18*a*, passes through PTC layers 16*c*, 18*c* respectively to reach outer plates 16*b*, 18*b*, then is conducted to metal end cap 15** from which it flows out of the PTC device.

In the accompanying drawings, the thicknesses of the various layers of PTC elements 16, 18 are exaggerated for clarity. A PTC element of the type used in the present invention has plates on the order of 0.5 millimeters thick and a PTC layer on the order of 0.5 millimeters thick.

PTC device 10 is intended for use as a replacement for a conventional cylindrical fuse, and as such body 12 and terminal caps 14, 15 combine to form a cylinder substantially identical to that of the fuse which the PTC device is intended to replace. Similarly, the hold current of PTC device 10 must be designed to match the amperage rating of the fuse which the PTC device is intended to replace. The hold currents of PTC elements 16, 18 are determined primarily by the surface area of the PTC layers through which current must flow between the inner and outer plates, and as such hold currents of the elements may be adjusted by increasing or decreasing the length and/or arc widths of the elements. It is not necessary that PTC elements 16,18 have identical lengths and/or arc widths. However, the PTC elements must have equal surface areas to prevent one PTC element from tripping before the other.

The term "semi-tubular" as used herein with respect to the PTC elements is not intended to be limited to a shape of exactly 180° arc width, but rather describes a shape which may comprise any fraction of a complete, 360° arc width tube. Accordingly, a semi-tubular PTC element as used in the present invention may have an arc width of more than or less than 180° in order to provide the surface area necessary to achieve the desired hold current for the PTC device.

As is well known in the art, when the flow of current through circuit overcurrent protection device 10 increases to a level above the designed hold current of the device, resistance heating of plates is sufficient to raise the temperature of PTC layers **16*c*, 18*c* to above a critical temperature of the PTC material. Due to the molecular properties of the PTC material, at temperatures above the critical temperature the electrical resistivity of the PTC material rises abruptly, such that current flow between the inner and outer plates of each PTC element is all but completely prevented. A very small "trickle" level of current flow continues, however, and this trickle current may be of sufficient magnitude to prevent the PTC elements from cooling down to below their critical temperature and returning to their lower resistivity, closed circuit state. Accordingly, the circuit in which circuit protection device 10** is installed must be switched off or otherwise open-circuited at some other location before the self-resetting circuit overcurrent protection device can cool down and reset.

In a second preferred embodiment of the invention shown in FIG. 2, a PTC device 100 has a tubular body 102 and terminal caps (not shown) substantially identical to those of the previously described embodiment. Enclosed within body 102 and the terminal caps are first and second pairs of PTC elements 104, 106 respectively disposed with concave surfaces facing one other. First element pair 104 comprises an inner PTC element 108 and an outer PTC element 110 in nested, concentric relationship to one another. Second element pair 106 comprises an inner PTC element 112 and an outer PTC element 114 in nested, concentric relationship to one another.

Each of the PTC elements 108, 110, 112, 114 making up the element pairs are of the same general construction and configuration as the PTC elements 16, 18 described hereinabove in relation to the first preferred embodiment. Inner plates **108*a*, 110*a*, 112*a*, 114*a* and outer plates 108*b*, 110*b*, 112*b*, 114*b* are semi-tubular, made from electrically conductive metal, and are disposed in nested, concentric relationship to one another and are separated by layers of PTC material 108*c*, 110*c*, 112*c*, 114*c***.

Within first PTC element pair 104, the inner plate 110*a* of the outer element and the outer plate 108*b* of the inner element are separated by an electrically insulating layer 116 made from, for example, a Mylar film. Within second PTC element pair 106, the inner plate 114*a* of the outer element and the outer plate 112*b* of the inner element are separated by an electrically insulating layer 118.

Inner jumper wires 120 electrically interconnect the four inner plates 108*a*, 110*a*, 112*a*, 114*a* of each of the PTC elements, and the interconnected inner plates are connected to a first of the PTC device terminal caps by a wire (not shown) or other electrically conductive means. Outer jumper wires 122 electrically interconnect the outer plates 108*b*, 110*b*, 112*b*, 114*b* of each of the PTC elements, and the interconnected outer plates are connected to a second of the terminal caps by a wire (not shown) or other electrically conductive means. Accordingly, the four PTC elements 108, 110, 112, 114 are connected in electrical parallel such that PTC device 100 has a hold current equal to the sum of the hold currents of each of the four PTC elements.

By arranging a plurality of semi-tubular PTC elements within a cylindrical body in the manner described and depicted herein and connecting them in electrical parallel, it is possible to fabricate a self-resetting circuit overcurrent protection device having both physical and electrical properties that permit the device to replace a conventional cylindrical fuse without requiring any modification of the circuit or the fuse receptacle.

Whereas a preferred embodiment of the invention has been illustrated and described in detail, it will be apparent that various changes may be made in the disclosed embodiment without departing from the scope or spirit of the invention.

The invention claimed is:

1. A cylindrical self-resetting circuit overcurrent protection device comprising:

at least two semi-tubular, positive temperature coefficient elements having opposite first and second ends and each element comprising first and second semi-tubular, electrically conductive plates disposed in nested, concentric relationship to one other and separated by a layer of material having a positive temperature coefficient of resistivity; and first and second cylindrical, electrically conductive terminal caps surrounding respective first and second ends of the at least two positive temperature coefficient elements, the first terminal cap being in electrical connection with the first plates and electrically insulated from the second plates and the second terminal cap being in electrical connection with the second plate and electrically insulated from the first terminal cap.

2. A self-resetting circuit overcurrent protection device according to claim 1 wherein the at least two semi-tubular positive temperature coefficient elements comprise first and second semi-tubular positive temperature coefficient elements disposed with concave surfaces facing one another.

3. A self-resetting circuit overcurrent protection device according to claim 1 wherein the at least two semi-tubular positive temperature coefficient elements comprise first and second semi-tubular positive temperature coefficient elements disposed in nested, concentric relationship to one another.

4. A self-resetting circuit overcurrent protection device according to claim 1 further comprising an electrically insulating envelope surrounding the at least two positive temperature coefficient elements and leaving exterior surfaces of the terminal caps exposed.

5. A self-resetting circuit overcurrent protection device according to claim 4 having an external configuration similar to a conventional cylindrical fuse and having a hold current equal to an amperage rating of the fuse.

6. A self-resetting circuit overcurrent protection device according to claim 1 wherein the positive temperature coefficient material is a polymer.

7. A self-resetting circuit overcurrent protection device according to claim 1 wherein the positive temperature coefficient material is a ceramic.

8. For replacing a conventional fuse having an amperage rating and a cylindrical body with terminal caps disposed at opposite ends thereof, a cylindrical self-resetting circuit overcurrent protection device comprising:

first and second semi-tubular positive temperature coefficient elements, each element having first and second semi-tubular, electrically conductive plates disposed in nested, concentric relationship to one another and separated by a layer of material having a positive temperature coefficient of resistivity, the first and second positive temperature coefficient elements being disposed with concave surfaces facing one another and yielding a hold current for the device equal to the fuse amperage rating;

first and second terminal caps surrounding opposite ends of the first and second positive temperature coefficient elements and configured to be identical with the fuse terminal caps, the first terminal cap being electrically connected with the respective first plates of the first and second positive temperature coefficient elements and the second terminal cap being electrically connected with the respective second plates of the first and second positive temperature coefficient elements; and an electrically insulating envelope surrounding the first and second positive temperature coefficient elements and having an external configuration similar to the cylindrical fuse body.

9. A self-resetting circuit overcurrent protection device according to claim 8 further comprising third and fourth semi-tubular positive temperature coefficient elements disposed in nested, concentric relationship with the first and second elements respectively.

10. A cylindrical self-resetting circuit overcurrent protection device comprising:

first and second semi-tubular, positive temperature coefficient elements disposed in nested, concentric relationship with one another to form a first element pair, the first and second elements each having first and second semi-tubular, electrically conductive plates disposed in nested, concentric relationship to one other and separated by a layer of material having a positive temperature coefficient of resistivity;

third and fourth semi-tubular, positive temperature coefficient elements disposed in nested, concentric relationship with one another to form a second element pair, the third and fourth elements each having first and second semi-tubular, electrically conductive plates disposed in nested, concentric relationship to one other and separated by a layer of material having a positive temperature coefficient of resistivity, the respective first plates of each of the four elements being electrically interconnected with one another and the respective second plates of each of the four elements being electrically interconnected with one another, the first and second element pairs being disposed with respective concave surfaces facing one another; and first and second electrically conductive terminal caps substantially surrounding opposite first and second ends of the first and second element pairs, the first terminal cap electrically connected with the first plates and the second terminal cap electrically connected with the second plates.

* * * * *